United States Patent
Venkatraman et al.

(10) Patent No.: US 12,242,366 B2
(45) Date of Patent: Mar. 4, 2025

(54) APPLICATION-SPECIFIC LAUNCH OPTIMIZATION

(71) Applicant: Apple Inc., Cupertino, CA (US)

(72) Inventors: Kartik Venkatraman, San Francisco, CA (US); David R. Cox, Kauai, HI (US); Manish Chandra Reddy Ravula, Saratoga, CA (US); Shardul S. Mangade, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 668 days.

(21) Appl. No.: 17/506,491

(22) Filed: Oct. 20, 2021

(65) Prior Publication Data

US 2022/0391301 A1 Dec. 8, 2022

Related U.S. Application Data

(60) Provisional application No. 63/197,426, filed on Jun. 6, 2021.

(51) Int. Cl.
*G06F 11/34* (2006.01)
*G06F 9/50* (2006.01)
*G06F 11/30* (2006.01)

(52) U.S. Cl.
CPC ........ *G06F 11/3442* (2013.01); *G06F 9/5055* (2013.01); *G06F 11/3051* (2013.01); *G06F 2209/501* (2013.01); *G06F 2209/5019* (2013.01)

(58) Field of Classification Search
CPC ............... G06F 11/3442; G06F 9/5055; G06F 11/3051; G06F 2209/501; G06F 2209/5019
See application file for complete search history.

(56) References Cited

U.S. PATENT DOCUMENTS

| | | | |
|---|---|---|---|
| 10,459,887 B1 * | 10/2019 | Dvortsov | G06F 3/0362 |
| 10,705,805 B1 * | 7/2020 | Bosworth | G06F 40/186 |
| 2008/0010361 A1 * | 1/2008 | Jacobs | H04L 67/125 |
| | | | 709/218 |
| 2014/0372356 A1 * | 12/2014 | Bilal | G06N 5/02 |
| | | | 706/46 |
| 2014/0373032 A1 * | 12/2014 | Merry | G06F 9/54 |
| | | | 719/328 |
| 2017/0220237 A1 * | 8/2017 | Jow | G06T 13/00 |
| 2018/0129537 A1 * | 5/2018 | Kurtzman | G06F 9/5083 |
| 2019/0230186 A1 * | 7/2019 | Yellin | H04L 67/5681 |
| 2020/0401418 A1 * | 12/2020 | Regev | G06F 9/547 |
| 2021/0329089 A1 * | 10/2021 | Yellin | H04L 67/5681 |
| 2021/0329091 A1 * | 10/2021 | Yellin | H04L 67/5681 |

(Continued)

*Primary Examiner* — Benjamin C Wu
(74) *Attorney, Agent, or Firm* — Kilpatrick Townsend & Stoctkon LLP

(57) ABSTRACT

Certain embodiments disclosed herein provide application-specific launch optimization. Aspects of the present disclosure include one or more cost functions for each application, where each cost function corresponds to a likelihood that a particular application should be placed into a particular pre-activation state. For each of the inactive applications, a respective one of the pre-activation states is selected based on comparing cost values obtained by evaluating the cost functions. Each of the inactive applications can be moved to or maintained in the respectively-selected pre-activation state to more efficiently provide an expedited application launch experience for a user.

20 Claims, 9 Drawing Sheets

(56) References Cited

U.S. PATENT DOCUMENTS

| | | | |
|---|---|---|---|
| 2021/0333987 A1* | 10/2021 | Roedel | G06F 9/451 |
| 2021/0397461 A1* | 12/2021 | Iyer | G06F 9/44521 |
| 2022/0019509 A1* | 1/2022 | Iyer | G06F 11/3409 |
| 2022/0179667 A1* | 6/2022 | Peled | G06F 9/44521 |
| 2022/0179668 A1* | 6/2022 | Peled | G06F 9/45558 |
| 2022/0237002 A1* | 7/2022 | Weinstein | G06F 12/123 |
| 2022/0261258 A1* | 8/2022 | Peled | G06F 9/451 |
| 2022/0308922 A1* | 9/2022 | Mutalik | G06F 9/5094 |
| 2022/0334850 A1* | 10/2022 | Wix | G06F 9/451 |
| 2022/0391301 A1* | 12/2022 | Venkatraman | G06F 9/5055 |
| 2023/0054174 A1* | 2/2023 | Peled | G06F 3/0481 |

* cited by examiner

APPLICATION-SPECIFIC LAUNCH OPTIMIZATION

CROSS-REFERENCE TO RELATED APPLICATION

This application claims the benefit of U.S. Provisional Application No. 63/197,426, filed Jun. 6, 2021, entitled "Application-Specific Launch Optimization." The disclosure of this application is incorporated by reference herein in its entirety.

BACKGROUND

Many users of computing devices routinely and actively use many applications over relatively brief periods of time. In order to provide the best possible user experience, an operating system for a computing device may keep recently-used applications resident in volatile memory ("memory," typically RAM) so that when the user returns to using such an application, the application relaunches seemingly immediately or near immediately relative to how long it takes the application to initially launch after powering or restarting the device.

Since the amount of memory in some computing devices is typically less than that available on traditional notebook or desktop computers, an operating system may remove an application from memory after some period of non-use, possibly subject to other considerations such as memory constraints for the particular device's system architecture. However, an application that otherwise launches quickly may be unnecessarily retained in memory, or conversely, an application that is less frequently used but slow to launch may be seldom or never retained in memory. It is desirable to more closely manage the resource usage of various applications that are, or can be, installed on a computing device, when such applications are inactive.

BRIEF SUMMARY

Aspects of the present disclosure include methods for providing application-specific launch optimization. Aspects of the present disclosure also include one or more cost functions, where each cost function corresponds to a likelihood that a particular application should be placed into a particular pre-lunch state. A cost function for an application can take into account, as examples, memory pressure and launch resources for the application and weigh these predictions against each other and, in some examples, against an informed estimate of a time to next activation by the user.

As an example embodiment, a method includes determining, by one or more processors of a computing device having a memory system, an amount of available memory in the memory system. The memory system includes volatile memory. The method further includes accessing on-device usage data for each of a number of inactive applications. The method also includes, for each of a number of inactive applications and each of a number of pre-activation states, evaluating a cost function to obtain a cost value indicating a preference for the inactive application to be placed into the pre-activation state. The method additionally includes, comparing, by the one or more processors, the cost values of the cost functions for the pre-activation states for the inactive applications to each other. The method further includes selecting, for each of the inactive applications, a respective one of the pre-activation states, as determined based on the comparing of the cost values, the amount of available memory, and the on-device usage data. The method further includes managing each of the inactive applications in the respectively-selected preactivation state.

As another example embodiment, a method includes detecting, by one or more processors of a computing device having a memory system, that an application previously loaded into the memory system is in a background state. The method further includes determining, by the one or more processors, a memory constraint for the memory system and a last-observed memory usage for the application. The method further includes determining a likelihood that the application will be activated by a user consistent with a relative activation time. The likelihood is determined based on an historical usage of the application. The method further includes determining, by the one or more processors, an objective value for maintaining the application in the memory system until the activation time, based on the memory constraint, the last-observed memory usage, and the likelihood of activation. The method further includes selectively maintaining the application loaded into the memory system based on the objective value.

Another aspect of the present disclosure includes a system comprising one or more processors and a memory that includes instructions that when executed by the one or more processors, cause the one or more processors to perform one or more methods as described above.

Other aspects of the present disclosure include a non-transitory computer-readable medium, that stores instructions that, when executed by one or more processors, cause the one or more processors to perform the methods described above.

A better understanding of the nature and advantages of embodiments of the present disclosure may be gained with reference to the following detailed description and the accompanying drawings.

DETAILED DESCRIPTION

Since the amount of memory in some computing devices is limited, an operating system may remove some applications from memory after some period of non-use, while retaining other more frequently-used applications in memory so that such applications relaunch quickly to provide a pleasing user experience. However, differences between applications in terms of usage over time and launch characteristics are not taken into account by such techniques. An application that otherwise launches quickly enough to please a typical user may be unnecessarily retained in memory, or conversely, an application that is less frequently used but slow to launch is seldom or never retained in memory even when it would be advantageous to do so in terms of the user experience.

Methods and systems are disclosed herein for providing application-specific launch optimization. These techniques can take into account not only on-device data showing device information, memory constraints, and possibly usage patterns, but also one or more cost functions for each application, where each cost function corresponds to a likelihood that a particular application should be placed into a particular pre-activation state. A cost function for an application can predict memory pressure and launch resources for the application and weigh these predictions against each other and, in some examples, against an informed estimate of a time to next activation by the user.

In some examples, multiple possible pre-activation states can be provided for some applications, and a cost function for each state can be evaluated on a per application basis. The cost function can be used to calculate an objective value (a potential reward) for maintaining the application in the particular pre-activation state and these values can be compared to choose among the pre-activation states for an application. Various pre-activation states can be used, e.g., in the continuum between (1) an application being fully executing in memory and displayed in a foreground or (2) being stored in a storage device from which a full load of the application is necessary, with no previous state information (or other application data) available. Any state between the foreground state (1) and standard storage with no history information of a previous state or other application data (2) can be considered a pre-activation state. As examples, pre-activation states can be characterized by retaining the application in memory ("docking" the application); by writing application data to non-volatile memory (e.g., flash or other storage device) for later retrieval ("freezing" the application), e.g., coupled with removing the application from memory; or by pre-loading some application code into memory ("prewarming" the application), e.g., for an application that was previously only stored on a storage device.

I. Launch Optimization System

Figure 1:
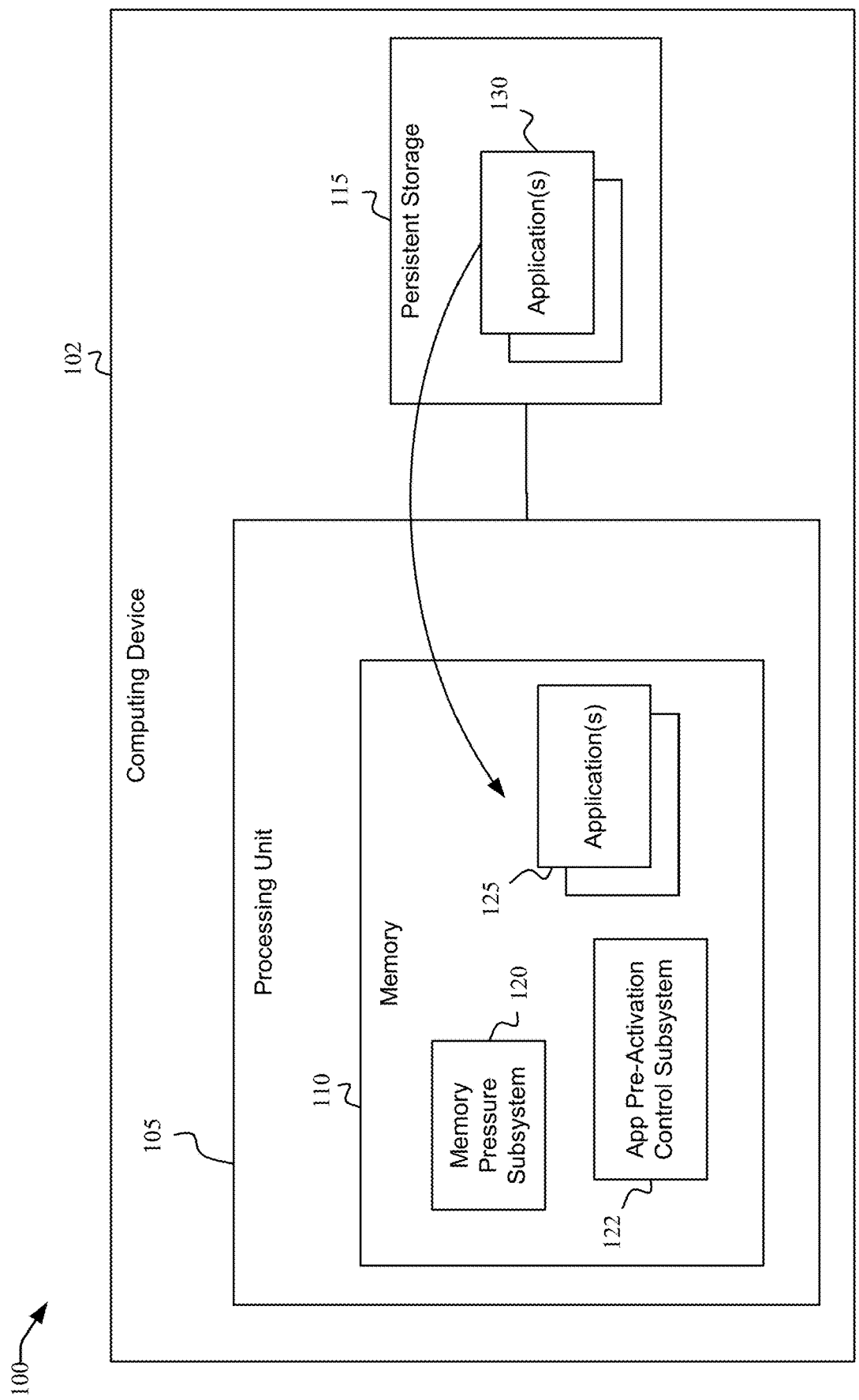
FIG. 1 illustrates an exemplary application launch optimization system according to certain aspects of the present disclosure.
Figure 2:
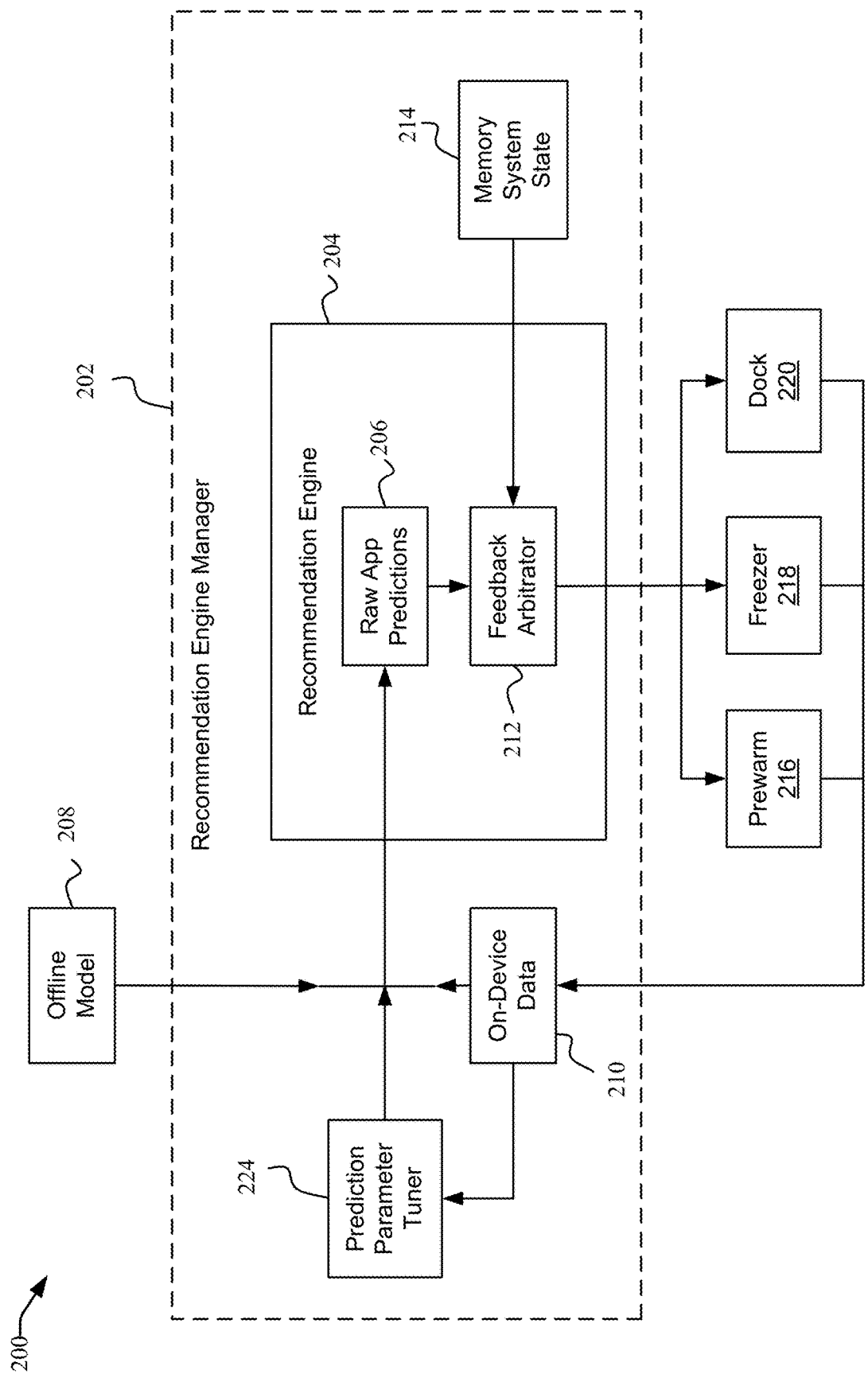
FIG. 2 illustrates an exemplary application launch optimization subsystem architecture for evaluating applications to provide launch optimization according to certain aspects of the present disclosure.

In exemplary embodiments described below, an example system for application launch optimization is shown. FIG. 1 and its description provides an overview of the system and FIG. 2 illustrates the pre-activation control subsystem architecture.

A. System Overview

FIG. 1 depicts a block diagram of a launch optimization system 100 for loading of applications from persistent storage into memory of a computing device according to certain embodiments. For purposes of illustration, the computing device 102 can be considered a mobile device, although the pre-activation optimization techniques herein can apply to any computing device, including desktop and notebook computers. Some embodiments may load applications from persistent storage into memory not to launch the applications (e.g., into the foreground) where they are actively running, but to have them in a "docked" pre-activation state. In some embodiments, when an application is "in the dock," the application is resident in memory, but not presented to a user in the foreground where the user can interact with the application. In certain embodiments, the application may be moved to the foreground more quickly when the application has been docked so that it is resident in memory than if the application had to be loaded from storage into memory when a user activates the application. Other example pre-activation states are described below.

In some embodiments, launch optimization system 100 includes a processing unit 105 and a storage device 115. Processing unit 105 can potentially include memory 110 and one or more processors (e.g., central processing units) (not shown here) that can execute computer code to perform one or more processes. Memory can, alternatively, or in addition, be separate from and communicatively coupled to processing unit 105. Memory 110 can include one or more applications 125 and a memory pressure sensing subsystem 120. Processing unit 105 in this example also includes application pre-activation control subsystem 122. Application(s) 125 can be one or more computer software applications that can perform tasks or functions, and may be part of the operating system.

In some embodiments, memory pressure sensing subsystem 120 can be software running on processing unit 105 that is resident in memory 110 and that can be accessed by one or more processors of processing unit 105. Memory pressure sensing subsystem 120 can determine information about memory 110, such as the available storage space on memory 110. In other embodiments, memory pressure sensing subsystem 120 can be a memory controller that provides information about the memory.

Application pre-activation control subsystem 122 can also be software running on processing unit 105 that is resident in memory 110 and that can be accessed by one or more processors of processing unit 105. Application pre-activation control subsystem 122 can determine information about the characteristics of the various inactive applications on the computing device and determine in which pre-activation state each application is likely best kept in, taking into account, as examples, memory pressure, usage history, and launch characteristics. An inactive application can be any application that is not actively providing output to or being used by a user or another device and not actively waiting for input in order to take some action.

In addition to the docked state already discussed, an inactive application in this example can be "prewarmed" or kept in a "prewarm" state. The prewarming can be implemented for an application that does not currently reside in memory (i.e., only stored on a persistent storage device). In a prewarm state, a subset of code of the application are loaded into memory as if launch had been interrupted. Application data that is kept in storage can also optionally be partially or fully loaded into memory. "Application data" may include data that is dynamic, or generated while the application executes, and that is not kept in storage over long periods of time such as might be the case with application user preferences or application settings. Application data may also include executable code for the application and/or executable code for libraries and frameworks used by the application. Application data may include, as examples, application execution state information or variable values that are output by one module of the application and consumed by another. The prewarm state allows an application to launch more quickly than if the entire application had to be loaded from storage into memory when a user activates the application, but less quickly than if the application had not been prewarmed. The amount of code that is loaded into memory (e.g., as defined by a stopping point before an end a typical loading process) can be determined based on various factors described herein, such as the amount of memory available, a total time for the application to load, etc.

Another pre-activation state supported by application pre-activation control subsystem can be referred to a "freezer," or a state in which the application is "frozen." In this frozen state, the application has been removed from or is not loaded into memory, but application data generated and used in running the application in the foreground is saved to storage to be readily accessed when the application is next launched. For purposes of the discussion herein, an application that is not in any of the above pre-activation states and is installed on the device has an associated "application bundle" resides in storage (NAND or "flash").

An application bundle contains the code and data (e.g. graphical images) that constitute the application. Remote content (i.e. from the Internet) is not part of the application bundle, but may be cached in storage. When an application is launched, its executable code and data are copied to memory (RAM). Temporary resources such as remote content, dynamic content (e.g. state in a game), and intermediate variables required for the application to function may also be stored in memory. Upon freezing the application, some or all of the application's data is moved from memory to storage. This storage space may be separate from the storage space allocated for the application bundle, and the application data within this additional storage space may be temporary in that it will be cleared upon termination of the application.

From a user's perspective, moving an application into the foreground for use may be seen as "launching" the application and thus pre-activation states may be referred to as "pre-launch" states. In the examples here however, some states are characterized by an application being launched or partially launched but not in the foreground or otherwise activated. For example, a docked application is fully launched and suspended to memory. A prewarmed application is partially launched, so additional work must be performed by the processor to fully launch the application upon activation.

Applications 130 are shown as stored on a persistent storage device 115. One or more of applications 130 or portions of applications 130 can be loaded from persistent storage device 115 of a mobile device into memory 110. Memory 110 may include one or more memories. In certain embodiments, persistent storage device 115 can be a data storage device such as non-volatile storage that can retain data after the device is no longer powered. In some embodiments, persistent storage device 115 can be on a same mobile device (e.g., a smartphone, tablet, or wearable device) as where memory 110 is residing. In other embodiments, memory 110 can be residing on a mobile device (e.g., a wearable device such as a smart watch) while persistent storage device 115 can be on another mobile device (e.g., a smart phone). One or more applications 130 on persistent storage device 115 of the other mobile device can be accessible by the mobile device, for example, through a network (e.g., Bluetooth®, Wi-Fi®).

One or more of applications 130 can be loaded from persistent storage device 115 to memory 110 when memory pressure sensing subsystem 120 determines that a "memory pressure" of memory 110 is below a threshold level. The loading of applications can be performed by processing unit 105. After loading an application 130 from persistent storage device 115, application 125 can be resident in the dock if it is not in the foreground and easily accessible by a mobile device upon which memory 110 resides. If the memory pressure subsystem 120 determines that the memory pressure is higher, for example, below a second threshold level but above the first threshold level, an application's state can be set to the prewarm state or the freezer. Applications can be demoted and promoted between at least some pre-activation states as the computing device operates. However, to move an application from the foreground or from the docked state to the prewarm state in this example requires that the operating system first terminate the application. An application can only be prewarmed if it does not have an associated process. In this context, the term "process" is intended as the term would be understood from the perspective of the operating system, rather than as synonymous with the term "procedure."

A memory pressure level can be a measure of memory availability where a high memory pressure level can indicate that the amount of available memory is less than a predetermined value (e.g., 10 MB) or that the amount of available memory relative to the total amount is less than a threshold (e.g., less than 10% of total memory). In some embodiments, a low memory pressure level can indicate that the amount of or percentage of free memory (e.g., usable memory) is greater than a threshold amount or percentage (e.g., configurable by a system administrator or a user of the mobile device).

B. Pre-Activation Control Subsystem Architecture

FIG. 2 depicts a block diagram of a launch optimization subsystem architecture 200 for evaluating inactive applications as candidates for pre-activation states and selecting the appropriate pre-activation state for an application. An inactive application is one that is not currently being used, that is, an application that is not presented to a user in the foreground where the user can interact with the application.

Launch optimization subsystem architecture 200 includes a recommendation engine manager 202, which can be program code instructions on a computing device that manages the evaluation of cost functions and arbitrating between various pre-activation states based on the cost value produced by the cost functions. Recommendation engine manager 202 includes recommendation engine 204, which includes raw application prediction module 206. The system is driven by predictions of application use, for example, predictions of which applications (apps) are most likely to be used on the particular type of device given its configuration. These predictions, as an example, can come from an offline model 208. Offline model 208 can, for example, be a machine-learning model that is kept updated and trained with information from testing many actual devices with many applications. The data from the offline model can be accessed by the computing device over a network, such as from a cloud storage system. Alternatively, model data can be copied onto the computing device, for example, as part of an operating system, in which case, the data can be updated when the operating system is updated.

The recommendation engine manager also includes on-device data 210. On-device data 210 in this example includes device specific data recorded over time that indicates what has happened in terms of application launches and user behavior. As an example, on-device data 210 may include a list of applications that have been launched and then killed immediately, together with the number of times this has occurred over some period for each of those applications. Such applications may be excluded from any pre-activation states. As another example, on-device data 210 may include information about how frequently or how constantly applications are used. The raw application prediction module 206 takes these predictions into account, and determines which applications should be considered for pre-activation states at a given time. In many cases, it would be too computationally intensive to evaluate every application on a computing device. Also, it may be desirable for some applications to be running or docked by default because they are important to the use of the device, although in the examples presented here, all applications can be killed by the user or the operating system at any time, or stop running due to encountering a bug and crashing. The on-device data and the application predictions can change based on contextual information such as the time of day or what other apps have been recently used.

It should be noted that in the examples described here, system services associated with applications may not be managed by the pre-activation control subsystem. A system service is assigned a high priority and thus is always running. An example is a system service associated with a telephone application that is used to receive calls on a smartphone.

Raw application predictions can also include predictions of launch resources and memory behavior. For example, the likely time taken for an application to launch to a useful state from storage once a user has invoked the application can be taken into account. Such predictions are useful because, for example, if launch resources for a specific application are low the cost-benefit for placing or managing the application in a pre-activation state may suggest the application is best not a candidate for pre-activation optimization.

Feedback arbitrator 212 of architecture 200 can take the raw application predictions as well as the memory system state 214 into account in evaluating cost functions, comparing cost values, and determining whether to manage an application in a pre-activation state (e.g., prewarm state 216, freezer state 218 or the dock 220), or possibly keep the application in storage only. Each of these states is managed by program code that controls processing unit 105 to manage the application code and any dynamic data to keep an application in its respective state. Prediction parameter tuner 224 can make adjustments to raw application predictions over time based on changing on-device data 210. These changes refine the list of candidates for pre-activation optimization that is used when cost functions are reevaluated and objective values are recomputed.

The feedback arbitrator 212 obtains cost values for pre-activation states for a candidate application. The cost functions change the prioritization between raw predictions. The feedback arbitrator 212 may choose between pre-activation states based on cost values alone. Additionally, feedback arbitrator 212 may first determine, based on raw predictions, that there are additional applications that are not good candidates for pre-activation states at all, essentially refining the candidate list from the raw application prediction module even further prior to calculating cost values. The feedback arbitrator 212 may also make decisions based on the current state and the raw application predictions when an application is not in an optimized pre-activation state. In some embodiments, the feedback arbitrator 212 applies determinant heuristics to make decisions based on cost values once the list of candidates for pre-activation optimization has been established. The changes in on-device data and the resulting changes in raw application predictions allow the system to achieve equilibrium over time.

II. Launch Optimization Process

Figure 3:
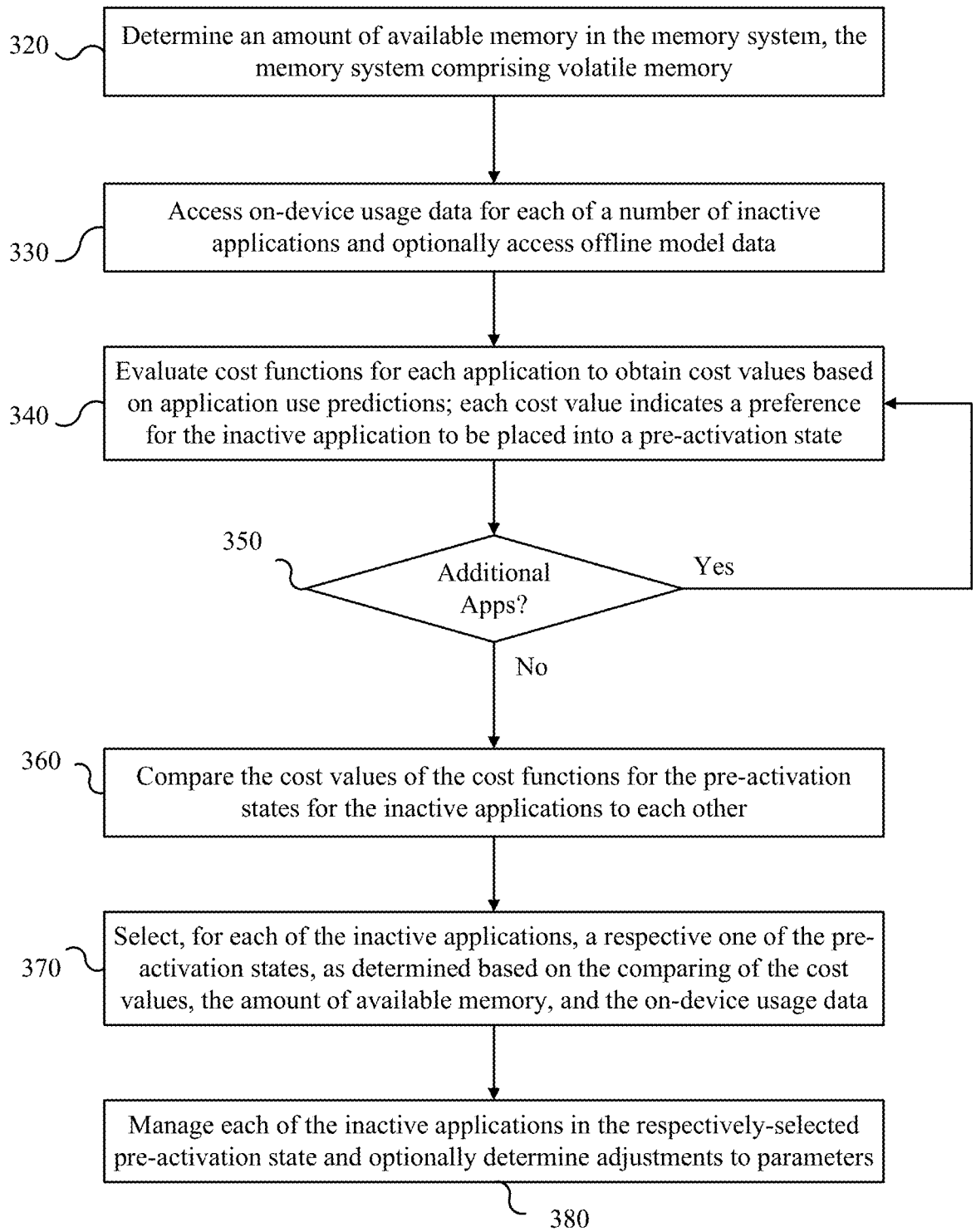
FIG. 3 illustrates an exemplary flowchart for providing application-specific launch optimization according to certain aspects of the present disclosure.
Figure 4:
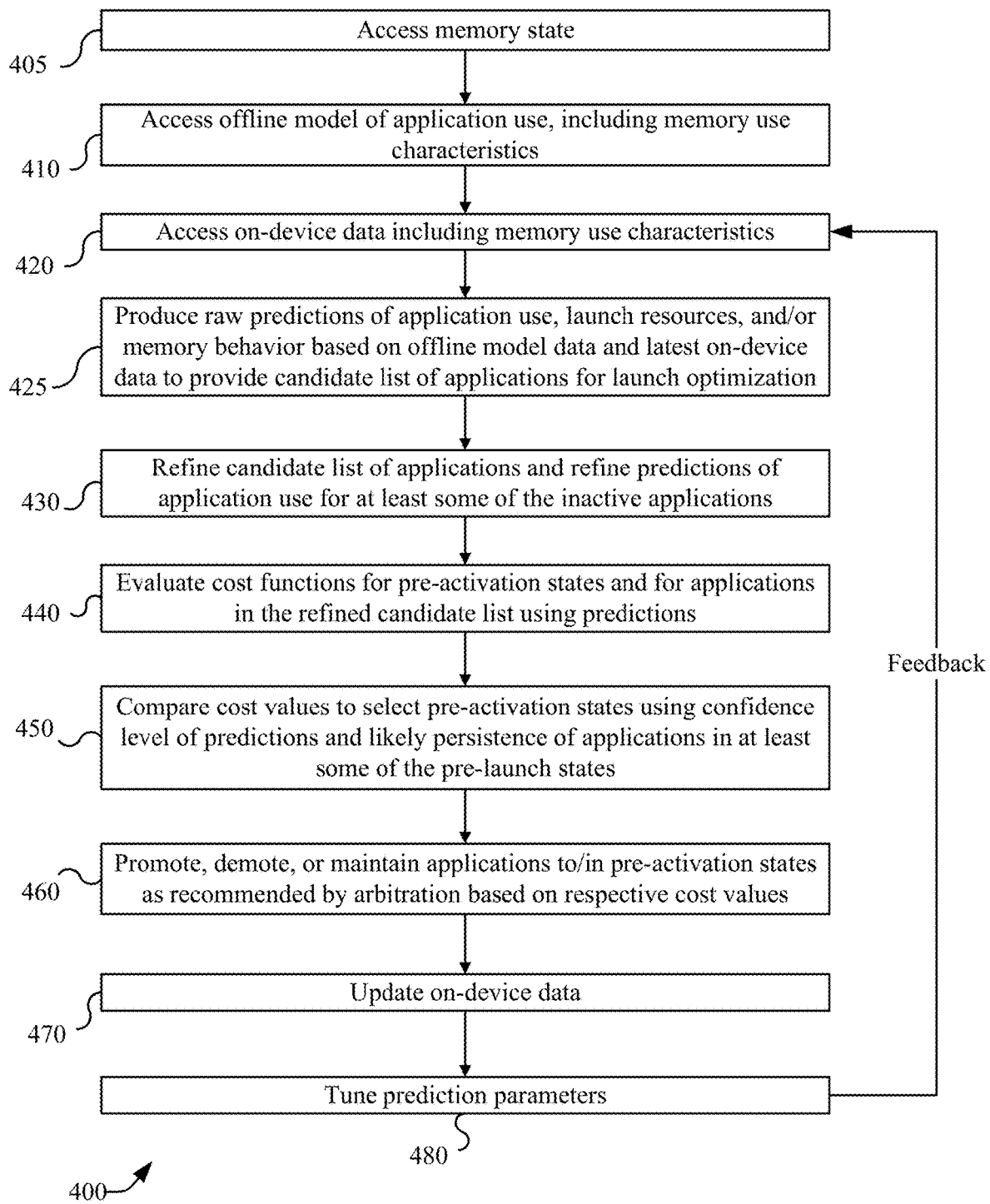
FIG. 4 illustrates an additional exemplary flowchart for providing application-specific launch optimization according to certain aspects of the present disclosure.

The flowchart in FIG. 3 illustrates one example of a launch optimization process. The flowchart in FIG. 4 illustrates another example of a launch optimization process that shows feedback and updating the on-device data in order to refine predictions to reach a stable equilibrium.

A. Launch Optimization Flow

FIG. 3 is a flowchart of an example process 300 associated with techniques for providing application-specific pre-activation optimization. In some implementations, one or more process blocks of FIG. 3 may be performed by a system such as system 100 of FIG. 1 or a computing device such as mobile device 900 discussed below with respect to FIG. 9, using the respective processing unit or processor.

At 320 of FIG. 3, the computing device determines an amount of available memory in the memory system. The memory system for purposes of this example includes volatile memory. The amount of available memory may be determined from memory pressure subsystem 120.

At 330, the computing device accesses on-device usage data for each of a number of inactive applications. The on-device usage data includes historical information about application use on the computing device. This information can be used to predict application use, for example, to predict times to next use of an application, applications likely killed soon after use, and other factors that may be used in making pre-activation state selection. These inactive applications can be identified from a recommendation engine, e.g. as described in FIG. 2. For example, the computing device may access on-device data 210 to obtain the on-device usage data. The computing device may also access data from an offline model of application use, which may be used to identify the inactive applications to analyze for whether to change a memory state.

At 340, the computing device evaluates cost functions for each application to obtain cost values, each indicating a preference for the inactive application to be placed into a respective pre-activation state. There can be a respective cost function for each pre-activation state. The cost functions and the resulting values can take into account predictions of application use, e.g., when a particular application is next going to be used. Such a prediction of a next use can be determined based on historical patterns, e.g., based on location and time. The cost functions and resulting values can also take into account memory usage characteristics of each application, as well as a time to launch for a given application (e.g., a low launch time might favor a frozen state). Memory usage characteristics can include, as examples, the memory footprint used by the application when in use and/or how the footprint changes depending on what state the application is in or what tasks it is performing. In some examples, the available pre-activation states include prewarm 216, freezer 218, or dock 220. The pre-activation states can also include a "state" in which the application is left to reside in storage.

At 350, a determination is made as to whether there are additional applications for which cost functions need to be evaluated. If so, the evaluation at 340 is repeated as needed. Otherwise, process 300 proceeds.

At 360, the cost values of the cost functions for the pre-activation states for the inactive applications are compared to each other. As an example, this comparison may be carried out by feedback arbitrator 212. The feedback arbitrator in some implementations can take into account the confidence level of predictions, or the persistence of the applications in the various pre-activation states. The confidence level can be provided by a proactive intelligence internal framework. In this context, the confidence level can be considered analogous to the Bayesian posterior associated with the system's "belief" that the particular prediction is accurate given (conditioned on) the system state. The feedback arbitrator can compare the cost value of one pre-activation state to those of other pre-activation states for an individual application, and can also compare cost values for the same cost function applied to different applications. In some embodiments, the lowest cost value (i.e., for a particular pre-activation state) for a given application is determined. Cost value in this example is equal to negative reward (−1*reward).

In some implementations, it can be determined whether two cost values for two pre-activation states of a same application are within a threshold. In such a situation, additional criteria can be used in later steps to determine which pre-activation state to select. Examples include: the amount of freezer budget (quantity of bytes written to NAND) remaining for the day, relative to the size of the application's "footprint" in RAM; existing "pre-launch" actions taken for the application (for instance, the system may not dock prewarmed apps until they have been foregrounded by the user or may not dock a frozen application, but might freeze a docked application); and the properties used as inputs to the cost functions.

At 370, a respective pre-activation state for each of the inactive applications is determined based on comparing the cost values. The determination can take into account the on-device usage data and the amount available memory as these inputs are provided to feedback arbitrator 212. In some embodiments, for a given application, the pre-activation state with the highest cost value (or lowest, depending on how the cost (loss) function is defined) can be selected. In situations with two or more cost values being within a threshold so there is no clear pre-activation state that is best, then additional criteria can be used, e.g., a preference to keep an application in a same pre-activation state. As examples, the available pre-activation states can include prewarm 216, freezer 218, or dock 220

At 380, the computing device manages each of the applications in its respectively selected pre-activation state. Applications may be promoted or demoted as suggested by the respective cost functions when an evaluation of the cost functions is next performed, and adjustments to prediction parameters may be determined for the next evaluation. In this example, prediction parameters correspond to coefficients used to adjust the weight given to the predictions of the various components of the system. There are many possible schemes for representing and refining these coefficients, one example is an artificial neural network, another example is a linear combination. These adjustments can be made based on updates to offline model data and/or on-device data The reference to a promotion or demotion can be concerned relative to the amount of memory to be used in a given pre-activation state.

B. Launch Optimization with Feedback to Refine Predictions

FIG. 4 illustrates an exemplary flowchart for a process 400 associated with techniques for providing application-specific pre-activation optimization. In some implementations, one or more process blocks of FIG. 4 may be performed by a system such as system 100 of FIG. 1 or a computing device such as mobile device 900 discussed below with respect to FIG. 9, using the respective processing unit or processor. Certain details on steps in process 400 are provided above in process 300.

At 405, the computing device accesses the memory system state to determine available memory. For example, computing device accesses the memory system state 214, which is maintained in recommendation engine manager 202.

At 410, the computing device accesses an off-line model (e.g., 208). The off-line model may have been copied onto the computing device, or may be retrieved over a network. The off-line model can be trained based on usage on the instant computing device, and potentially other computing devices. For example, the model can be trained based on data gathered from many test computing devices running many different applications and may reflect typical application use characteristics for popular applications, including memory use characteristics.

At 420, the computing device accesses on-device data, such as on-device data 210. The on-device data can be kept updated through feedback obtained as applications are promoted, demoted, and/or launched from the various available pre-activation states by the user. The on-device data can also be updated based on how often and/or how much the user interacts with an application when it is in the foreground. The on-device data may also include memory use characteristics. Feedback can also include how often and/or how much the user interacts with an application when it is in the foreground.

At 425, raw predictions of application use based on the off-line model data and the latest on-device data are used to provide a candidate list of applications for launch optimization. Some applications will not be candidates for launch optimization because, as examples, the application needs to remain docked due to the services it provides, or because launch resources are low.

At 430, feedback arbitrator 212 refines the candidate list. Feedback arbitrator 212 may eliminate some applications and reduce the candidate list further based on current or last-computed cost values for the applications subject to the raw predictions. The feedback arbitrator can provide refined predictions of application use for the refined candidate list. These predictions of application use can inform the evaluation of the cost functions. For example, the cost of moving an application to a pre-activation state that increases launch time is higher for an application that is used more.

At 440, the computing device evaluates cost functions for a set of pre-activation states of the applications, and the cost values of the cost functions for the pre-activation states for the inactive applications are compared to each other. Cost functions can be evaluated for applications in the refined candidate list using one or more of the predictions of application use. As examples, the available pre-activation states can include prewarm 216, freezer 218, or dock 220.

Cost functions can take into account any relevant cost inputs. As examples, a cost function can take into account power source, power usage, memory device wear, battery wear, memory pressure, the status of other applications, available storage, or storage device wear. Launch resources and times from the various states can also be inputs to a cost function. Memory footprint for the various states can also be a cost function input. For the freezer state, the cost function can include a cost to write to storage because most operating systems manage solid-state storage writes within a budget in order to minimize device wear. Additionally, a cost function for the freezer state can take into account how much of the data that was written to storage is actually brought back into memory when the application launches. In some examples, the entire state of the application is written to storage as part of the freeze state, but when the application launches and is loaded back into memory, the application only loads a portion of the data that was written to storage. These differences are described by credits and debits in the cost function. If the credit-to-debit ratio for an application is relatively high, then the cost to freeze that application is relatively low.

At 450, cost values are compared in order to select the pre-activation states for the candidate applications. As examples, the available pre-activation states can include prewarm 216, freezer 218, or dock 220. These cost value comparisons can be provided by feedback arbitrator 212. The feedback arbitrator can take into account the confidence level of predictions. The feedback arbitrator can also determine a likely persistence of the applications in the various pre-activation states. For example if a user is likely to kill an application quickly, the arbitrator might still recommend the prewarm state but would not quickly recommend freezing. The arbitrator can also take the practicality of state transitions into account. For example, an application in prewarm cannot effectively go straight to the freezer because the application runtime data has not been created.

The feedback arbitrator may determine that if an application that is in storage is a candidate for prewarm even though a user has not invoked the application, and thus may exclude the application from the other states without calculating a cost function for the other states. In some examples, there are other exclusionary factors, for example, an application in memory may not meet criteria to be demoted to one of the other states because of the timing of its launch or where the application is within its execution cycle.

At 460, applications are promoted to, demoted to, or maintained in, a selected pre-activation state, as recommended by feedback arbitration using respective cost values. As examples, the available pre-activation states can include prewarm 216, freezer 218, or dock 220. Maintaining an application in a pre-activation state may include keeping an application residing solely in storage. Likewise, demoting an application to a pre-activation state may include removing the application from the dock or the freezer and allowing the application to reside only in storage going forward.

At 470, on-device data is updated based on actions being taken relative to moving or maintaining each application in its respective pre-activation state. On-device data can also be updated based on information about launching, backgrounding, or killing applications. Updates to on-device data can also take into account application updates made by the developer that change the way the application operates, for example an update that may cause the user to access the application more due to added functionality.

At 480, prediction parameters may be adjusted by the computing device using prediction parameter tuner 224. The updating of the on-device data and the prediction parameter adjustment provides application use feedback to the feedback arbitrator so that use predictions become more accurate and pre-activation state selection is tuned to provide a better user experience over time.

III. Exemplary Application Distribution

Described below is an exemplary application distribution among pre-activation states, shown changing over time. Such a distribution may be produced by the architecture of FIG. 2 and/or processes 300 or 400.

Figure 5:
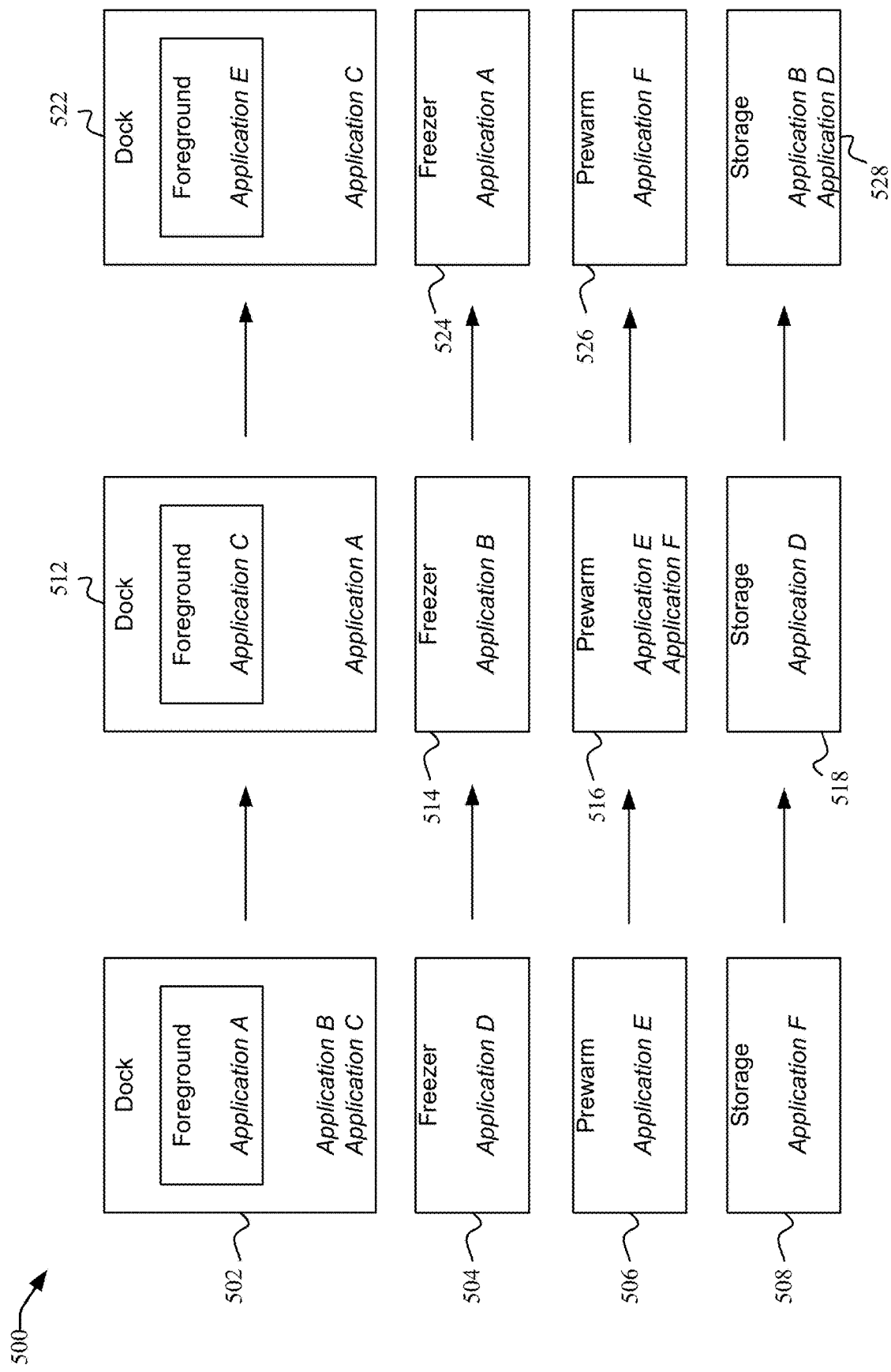
FIG. 5 illustrates an exemplary preactivation state distribution for application-specific launch optimization according to certain aspects of the present disclosure.

FIG. 5 illustrates an exemplary application distribution 500 of inactive applications that are in different pre-activation states or fully in storage. Distribution 500 includes dock state 502, freezer state 504, prewarm state 506, and storage 508. These pre-activation states are in effect at a specific time. Time is shown advancing to the right. More specifically, dock 502 includes a foreground application A, and backgrounded, docked applications B and C. Freezer 504 includes application D. Prewarm state 506 includes application E. Application F is residing only in storage 508.

After another arbitration, the states of these applications are shown by docked state 512, freezer state 514, prewarm state 516, and storage 518. Application C has moved from being a docked but backgrounded application to being a foreground application because the user has brought it to the foreground for use. Previously foregrounded application A has now become a docked, background application. Application B, previously docked, has been moved to freezer 514. Application F, previously residing only in storage, has been moved to prewarm state 516 as the cost functions and use predictions indicate that it may be used soon and that prewarm will efficiently provide a faster launch for the user. Application D, previously frozen, has been demoted to storage only. Application D has been demoted to storage because the cost function and use predictions have suggested that application B will not be used soon enough to justify the freezer resources. Launch resources for application D, perhaps being moderate as compared to other applications, are also taken into account.

After another arbitration, the applications reside as illustrated by dock state 522, freezer state 524, prewarm state 526, and storage state 528. Application E, previously in prewarm, has been moved to the foreground for use by the user of the computing device. Application C is now backgrounded but remains docked. Application A, previously docked, has been moved to freezer 524. Prewarm state 526 has changed only in that application E has been removed since it is now in the foreground. Application B, previously frozen, has been released and now resides solely in storage 528 because the cost function and use predictions have suggested that application B will not be used soon enough and/or its subsequent launch will not be slow enough to justify the resource use for any other pre-activation state.

IV. Exemplary Cost Function Implementation

Figure 6:
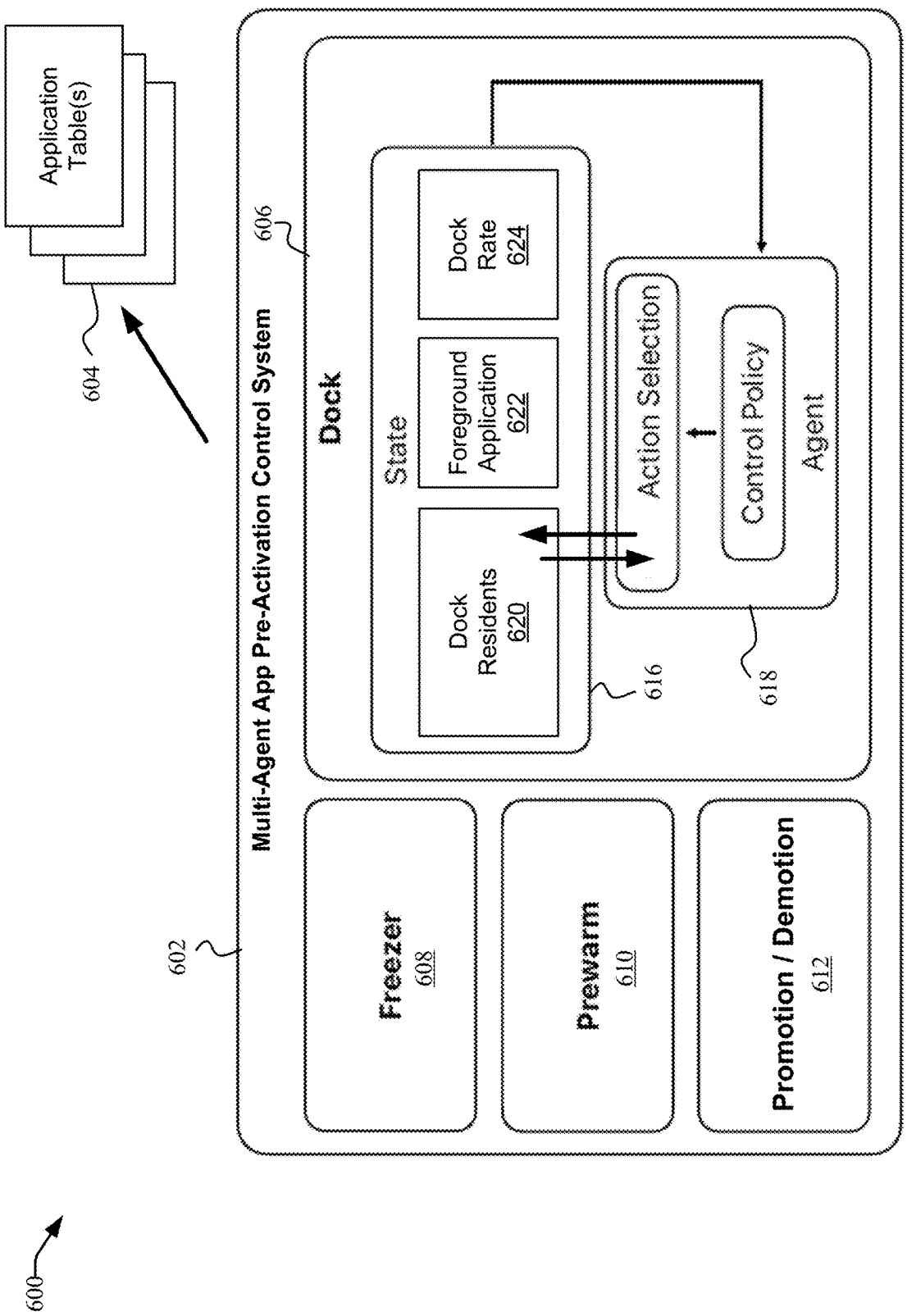
FIG. 6 illustrates an exemplary system providing multi-agent application preactivation control using one or more cost functions according to certain aspects of the present disclosure.
Figure 7:
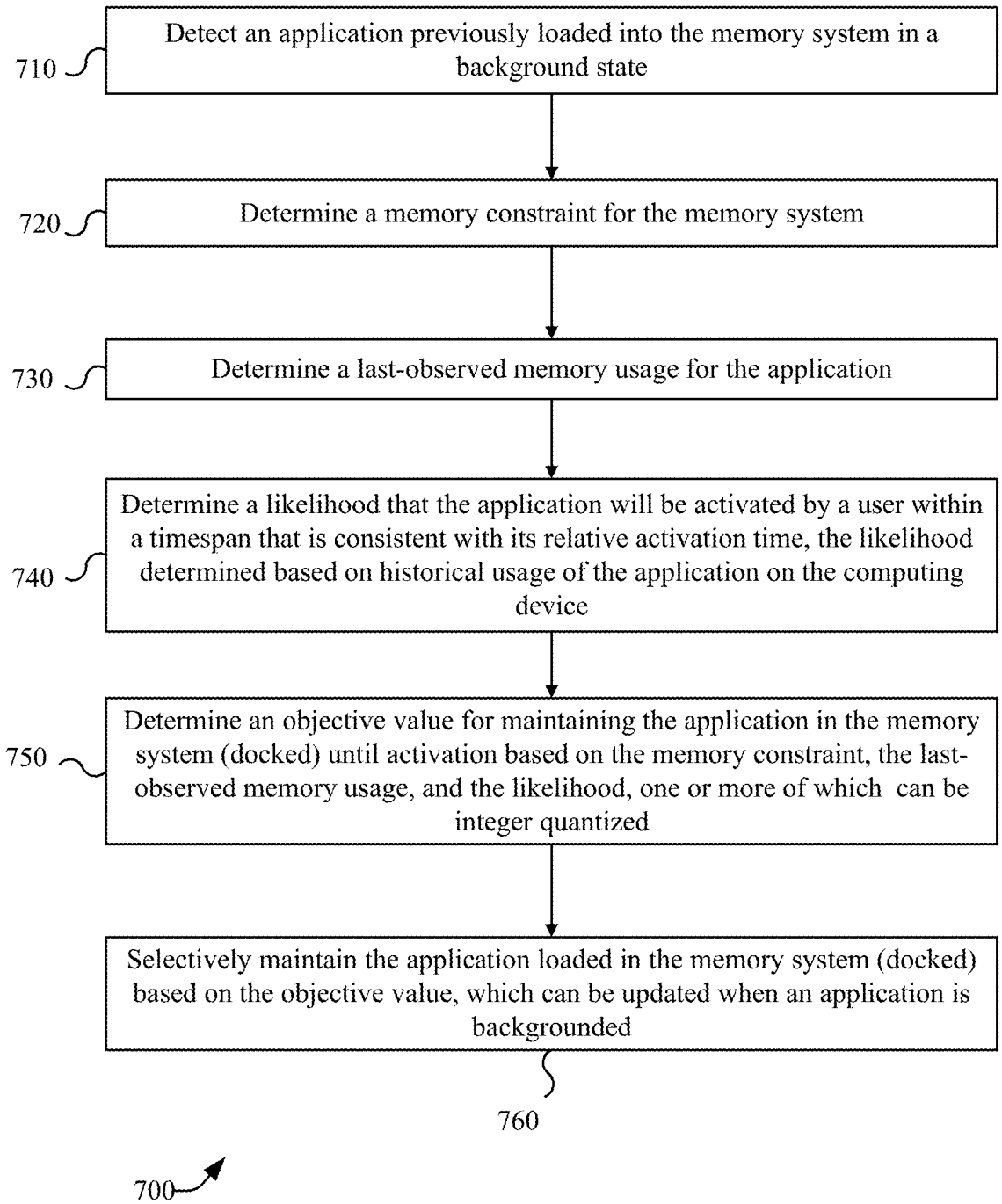
FIG. 7 illustrates an exemplary flowchart for evaluating a cost function according to certain aspects of the present disclosure.
Figure 8:
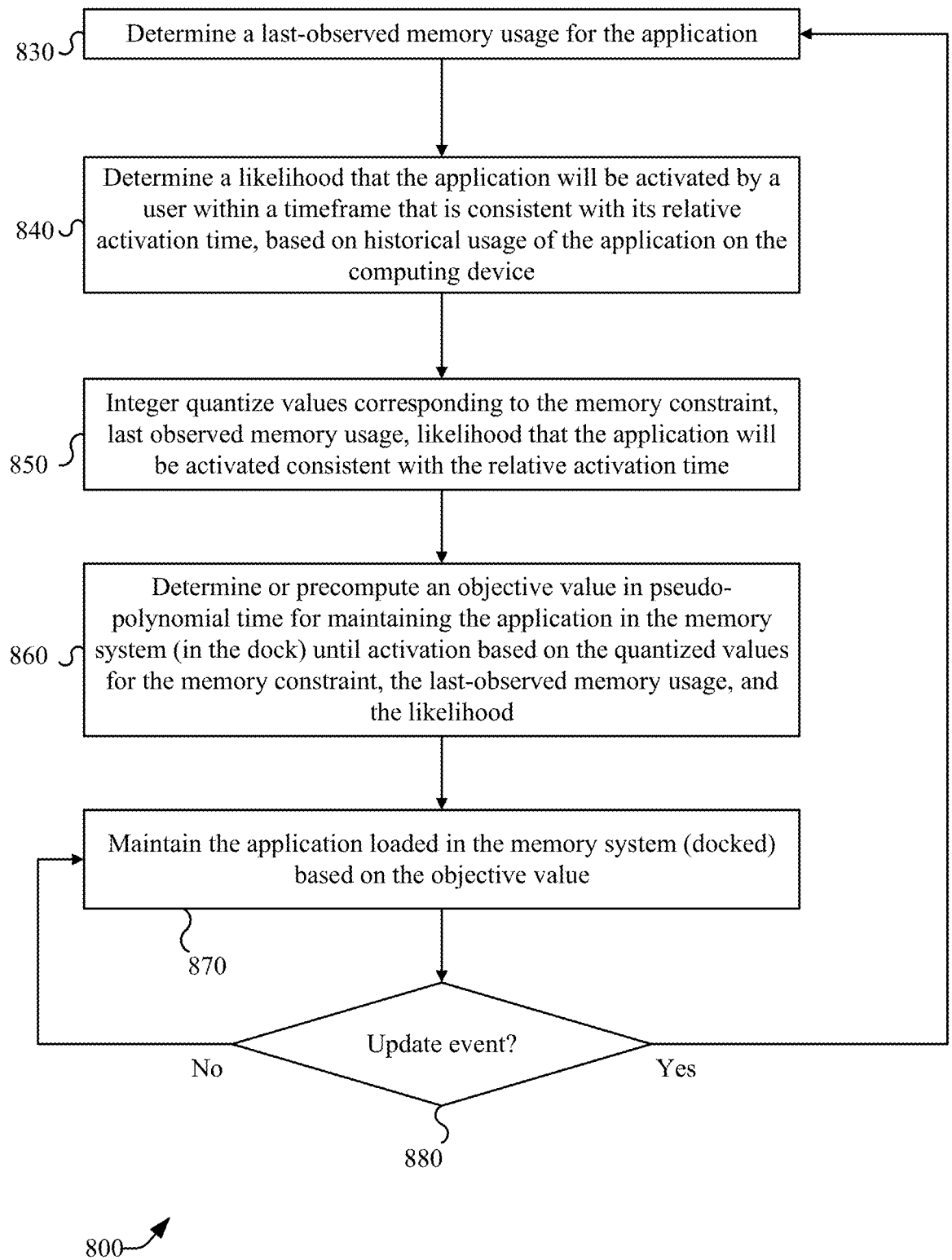
FIG. 8 illustrates an additional exemplary flowchart for evaluating a cost function according to certain aspects of the present disclosure.

The sections below describe an example implementation of a cost function within the feedback arbitrator. FIG. 6, discussed in the first section, describes the internal architecture of the feedback arbitrator with respect to the cost function. Example flows for the cost function are illustrated in FIG. 7 and FIG. 8, discussed in the next two sections.

A. Multi Agent Pre-Activation Control System

Subsystem 600 includes multi-agent application pre-activation control system 602 and one or more stored application tables 604. The pre-activation control system 602 implements a cost function (not shown) for the dock state using an agent, described below. Application table 604 can store various dock configurations for use by the cost function. Each dock configuration includes a memory allocation for the configuration and an optimized list of applications for that configuration.

In the example of FIG. 6, the pre-activation control system 602 includes a dock module 606 for managing the dock, a module 608 for managing the freezer, a module 610 for managing the prewarm state, and a module 612 for managing the movement of applications from one state to another. Dock module 606 includes a dock state 616 and an agent 618. The agent 618 includes an action selection and a control policy that governs the action selection based on evaluating the cost function being used for the dock state. Current dock state 616 includes a list 620 of dock-resident, backgrounded applications (not shown), an identification 622 of the current foreground application, and a current dock arbitration rate 624. The current dock state 616 informs agent 618. The current dock state 616 may also include values for available memory, a description of likely user actions, and other useful values and information. Upon a change, for example, the activating or backgrounding an application on the device, certain user input, or the passage of a specified amount of time, the agent determines the next action. The cost function implemented by dock module 606 in this example can include a Markov decision process that uses dynamic programming, or other form of deterministic finite space optimal control.

As an alternative to dynamic programming, reinforcement learning based on a nondeterministic, nonfinite space can provide continuous optimal control. However, to use reinforcement learning efficiently, agent 618 can make use of estimates provided by a parametric function. In some examples, values for the parametric function can be provided by a trained neural network. In such an implementation, training data can be gathered in the laboratory and the neural network can be trained in advance and stored.

In another example, agent 618 can use binary integer programming, a form of dynamic programming that falls into the weakly nondeterministic polynomial-time complete ("NP-complete") complexity class. The use of binary integer programming allows computations for the cost function to be carried out with a minimal impact on computing device power and performance.

B. Cost Function Flow

The flowchart in FIG. 7 illustrates one example of a process for evaluating a cost function for an application. This process can be used in a computing device as a stand-alone feature to optimize and manage a dock. Alternatively, this process can be used for the dock state and a similar process can be implemented for other pre-activation states in a pre-activation optimization system.

FIG. 7 is a flowchart of an example process 700 associated with techniques for evaluating a cost function for pre-activation docking of an application. This process can be executed in parallel for multiple applications. In some implementations, one or more process blocks of FIG. 7 may be performed by a system such as system 100 of FIG. 1 or a computing device such as mobile device 900 discussed below with respect to FIG. 9, using the respective processing unit or processor.

At 710 of process 700, the computing device detects an application previously loaded into the memory system being in a background state. It would also be possible to determine that an application not in the memory system should be docked.

At 720, the computing device determines one or more memory constraints for the memory system. Memory constraints can be tied to the device configuration. Alternatively, or in addition, memory constraints can include constraints imposed because certain other applications are running or because the device is being used in a particular power state. In some implementations, the amount of memory allocated towards docking applications will be limited, creating a memory constraint. The total value for the amount of memory allocated towards docking applications can be based on the memory that each docked application consumes once it is suspended in the background. This constraint may be imposed to prevent adverse effects on the efficiency with which the processor deals with memory. Such adverse effects can cancel out some of the benefits of docking applications. An example of such an effect is excessive, continuous termination of system processes and non-docked background applications. This can reduce the stability of the system, as tasks such as photo library syncing would not run as intended. Furthermore, this would introduce excessive battery drain and excessive CPU usage, as many of the system services re-launch themselves upon termination, creating a resource-wasting cycle.

At 730, the computing device determines a last observed memory usage for the application. This last observed memory usage may include as examples, when the application wrote to or read from memory or when certain portions of the application have been loaded from storage into memory.

At 740, the computing device determines the likelihood that the application will be activated by the user within a timespan that is consistent with its relative activation time. The relative activation time is equal to the relative number of activations for a given application within the past 48 hours, times (multiplicative product) the mean (statistical average) subtractive difference in the time required to launch vs. resume the application (as measured on the specific user's device). The relative activation time in this example if a measure of the quantity of activation time saved by docking the application. This likelihood is determined based on the historical usage data for the application on the computing device, which can be obtained, as an example, from on-device data 210. One or more of the values determined above can be integer-quantized so that floating-point values are reduced in resolution and thus computations can be accomplished more efficiently. In one example, the floating-point values are quantized into 8-bit integers, rather than the more common 32-bit integers. The values can then be stored using approximately one fourth the space that would otherwise be required.

At 750, the computing device determines an objective value for maintaining the application in the memory system (in the dock) until activation. This determination takes into account the memory constraint(s), the last observed memory usage, and the likelihood that the application will be activated in accordance with the relative activation time. The objective value can be recomputed upon detection of an update event, such as the passages of a specified amount of time, any of various user inputs or events, or when any application is backgrounded, by user input or otherwise. The objective value can be determined using a cost function with memory constraint values, observed memory usage values, likelihood and time values as inputs. Integer quantization is used in this example. A cost function like that described below with respect to FIG. 8 may be used. Other cost functions may be used as well. R is the cost value (or the "objective value"), also sometimes referred to as the reward, which is a product of the probability that the application will be used at a certain time, and the difference between the time required to launch the application from scratch and the time required to resume the application if it is running in the background. This product describes the expected gain from docking the application.

For multiple applications, given a single device with n applications installed at time $$\text{maximize: } \sum_{j=1}^{n} r_j x_j$$

-continued $$\text{subject to: } \sum_{j=1}^{n} w_j x_j \leq K_d,$$

$$x_j \in \{0, 1\}, j, ,$$

for a binary choice variable $x_j$ representing dock residency of application j, a last observed memory footprint of the application upon suspension $w_j$, and a total memory constraint $K_d$ assigned to device hardware class d. The reward $r_j$ for docking the application is proportional to $p_j$, the prior belief that the application will be activated at time $t_i$ times the mean difference in launch time vs. resume time and is determined at 860. The total memory constraint in this implementation is a limit on the maximum sum-total bytes consumed by the physical footprints (in RAM) of all docked applications combined. For example, a device with 4 GB of RAM might have a total dock memory constraint of 400 MB. If there are five applications that could be potentially docked, each consuming 100 MB of RAM, then at most four applications could actually be docked. The calculation shown above corresponds to finding the best four out five applications to dock in this example.

At 760, the computing device selectively maintains the application loaded into the memory system based on the objective value. The application may or may not be removed from the dock for a given iteration. An application can also be moved to the dock from another state.

C. Cost Function Using Binary Integer Programming with Quantization

FIG. 8 is a flowchart of an example process 800 associated with techniques for efficiently computing and updating a value for a cost function for pre-activation docking of an application. This process can be executed in parallel for multiple applications. In some implementations, one or more process blocks of FIG. 8 may be performed by a system such as system 100 of FIG. 1 or a computing device such as mobile device 900 discussed below with respect to FIG. 9, using the respective processing unit or processor. For purposes of this example it can be assumed that the memory constraint does not change for every iteration. The cost function can be used in a computing device as a stand-alone feature to optimize and manage a dock. Alternatively, this cost function can be used for the dock state and other cost functions can be implemented for other pre-activation states in a pre-activation optimization system. The other cost functions can be similar to or different from the dock cost function. This example dock cost function uses dynamic programming with optimal sub-structure.

At 830 of process 800, the computing device determines a last observed memory usage for the application under consideration. This observation is typically based on the point in time where the application was backgrounded or became inactive.

At 840, the computing device determines the likelihood that the application will be activated by a user within a timespan that is consistent with its relative activation time as previously discussed. This likelihood is determined based on historical usage of the application on the computing device, as may be determined, for example, from the on-device data 210.

At 850, the values corresponding to one or more of the memory constraints, last observed memory usage, likelihood, time, and potentially any others used by the cost function are integer quantized to enable more efficient use of computational resources for evaluating the objective function. In this example, the most significant values for the cost function can be converted from eight-byte floating point values to one-byte integer values. All priors are rescaled before this conversion by Z-normalizing the values to set the values to have zero mean and unit-standard deviation.

At 860, the objective value is determined by evaluating the cost function as described with respect to 750 of FIG. 7. The value indicates a preference for keeping the application in the memory system (docked) until a activation based on the quantized values. The objective value is calculated using the cost function implemented by agent 618, which in this example is based on the zero-one knapsack problem. The calculation can be done in pseudo-polynomial time as previously described. Pseudo-polynomial time takes the CPU time and the memory space that are proportional to the number of apps being considered times the capacity set for the dock in bytes. The choice evaluated for a given application in this example is binary; to dock or not to dock.

Upon an update event, the reward value is updated and used to again determine whether an application should be docked. Applications that are both running and not frozen by the operating system kernel or the pre-activation control system are considered admissible inputs. The reward $r_j$ for docking an application is computed by:

$$z_j = 0x64 \cdot \left(\frac{p_j - \mu_p}{\sigma_p}\right)$$

$$r_j = 0x80 + \begin{cases} \begin{cases} 0x7F & z_j \geq 0x7F \\ 0x7F \cdot -0x01 & z_j < 0x7F \end{cases} & |z_j| \geq 0x7F \\ z_j & |z_j| < 0x7F \end{cases}.$$

0x7F is the hexadecimal equivalent to the decimal value of 127. The value 127 appears in this case because 127+128=255, which is the largest integer value that can be represented using a single byte. 0x80 (hex)=128 (decimal). A byte takes hexadecimal values in the rage [0x00-0xFF], which corresponds to the decimal range [0-255].

Continuing with process 800, at 870, the subject application is maintained in the memory system (in the dock state). The agent may keep the application in the docked state based on the most recently calculated objective value.

At 880, the computing device monitors for an update event, such as the expiration of a period of time, certain user input, or a newly backgrounded application. Upon the update event, the calculations repeat beginning at 830 for each application. Each time, process 800 is applied to each candidate application and the population of docked applications is updated. Each time, updates to the on-device data resulting from application use since the last arbitration by feedback arbitrator 212 are automatically taken into account.

In some examples, the dynamic programming problem described above is accomplished using optimal substructure, where the solution for a given amount of dock space is recomputed for increasing dock capacities, and the optimal population of applications for each capacity is stored in an application table such as one of application tables 604 of FIG. 6. For example, a dock configuration is computed for a capacity of one byte (which probably could not hold any applications), then two bytes, then 10 bytes, then 50 bytes, a kilobyte, a megabyte, etc., until the optimal configuration does not change until the capacity constraint has been hit, at which point the optimal configuration will have been obtained.

V. Exemplary Computing Devices

Figure 9:
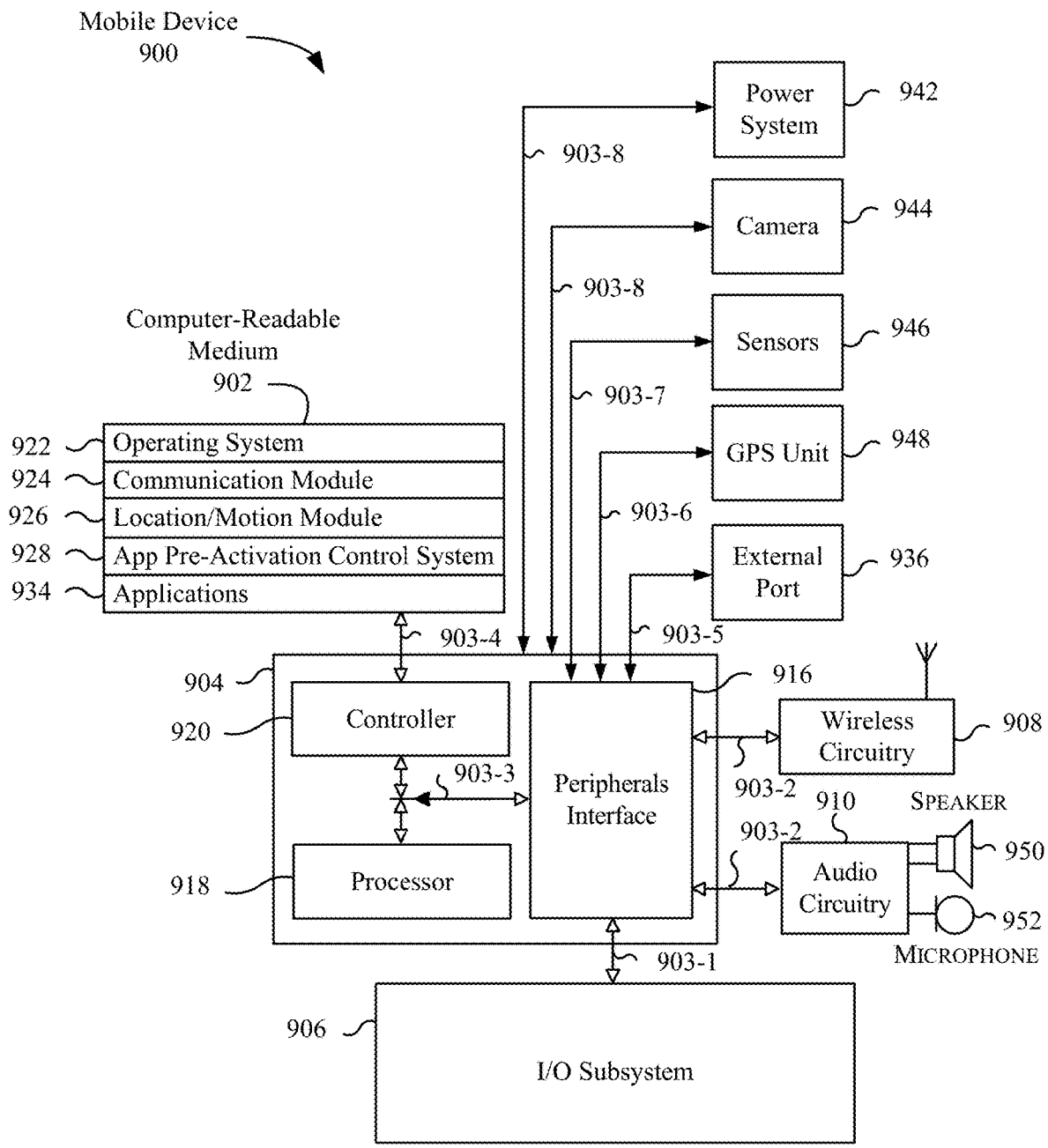
FIG. 9 is a block diagram for an exemplary computing device according to certain aspects of the present disclosure.

FIG. 9 is a block diagram of an example device 900, which may be a mobile device. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein.

Wireless circuitry 908 is coupled to processing system 904 via peripherals interface 916. Peripherals interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, an application pre-activation control system 928, and other applications (or set of instructions) 934.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Pre-activation control system 928 includes modules that implement cost functions using agents to assign pre-activation states to applications. For example, pre-activation control system 928 may include a module for managing a dock, a module for managing a freezer, and/or a module for managing a prewarm state. These modules are used to implement embodiments described herein. A module may include a current state and an agent implementing actions and control policies based on evaluating the cost function being used for the state. For example, the current state may include values for available memory and a description of likely user actions. Upon an update event, the agent determines the next action.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or track pad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

What is claimed is:

1. A method comprising performing, by one or more processors of a computing device having a memory system:
   determining an amount of available memory in the memory system;
   accessing on-device usage data for each of a plurality of inactive applications;
   for each of the plurality of inactive applications:
      for each of a plurality of pre-activation states:
         evaluating a cost function to obtain a cost value indicating a preference for the inactive application to be placed into the pre-activation state;
      comparing the cost values of the cost functions for the plurality of pre-activation states for the plurality of inactive applications to each other; and
      selecting, for each of the plurality of inactive applications, a respective one of the plurality of pre-activation states, as determined based on the comparing of the cost values, the amount of available memory, and the on-device usage data;
   managing each of the plurality of inactive applications in the respectively-selected pre-activation state, where managing the inactive application includes placing the inactive application into or maintaining the inactive application in the respectively-selected pre-activation state; and
   launching at least one of the plurality of inactive applications from the respective one of the plurality of pre-activation states.

2. The method of claim 1, wherein managing at least one of the inactive applications in one the plurality of pre-activation states includes (1) retaining the inactive application in the memory system, (2) moving a portion of the inactive application into the memory system, or (3) moving at least some application data from the inactive application onto a storage device.

3. The method of claim 1, further comprising:
   accessing an offline model of application use; and
   evaluating the cost function to obtain the cost value in part using the offline model of application use.

4. The method of claim 3, wherein at least one of the offline model of application use or the on-device usage data includes memory usage characteristics for at least some of the plurality of inactive applications.

5. The method of claim 1, further comprising:
   producing at least one prediction of application use for at least some of the plurality of inactive applications; and
   evaluating the cost function to obtain the cost value in part using the at least one prediction of application use.

6. The method of claim 5, further comprising selectively tuning prediction parameters for producing the at least one prediction of application use.

7. The method of claim 1, wherein evaluating the cost function further comprises determining a likely persistence of the inactive application.

8. The method of claim 1, further comprising determining the plurality of inactive applications for the evaluating of the cost function based on at least one of a current cost value, a last-computed cost value, a prediction of application use, a prediction of launch resources, or a prediction of memory behavior.

9. A non-transitory computer-readable medium storing a plurality of instructions that, when executed by one or more processors of a computing device, causes the one or more processors to:
   determine an amount of available memory in a memory system;
   access on-device usage data for each of a plurality of inactive applications;
   for each of the plurality of inactive applications:
      for each of a plurality of pre-activation states:
         evaluate a cost function to obtain a cost value indicating a preference for the inactive application to be placed into the pre-activation state;
      compare the cost values of the cost functions for the plurality of pre-activation states for the plurality of inactive applications to each other; and
      select, for each of the plurality of inactive applications, a respective one of the plurality of pre-activation states, as determined based on the comparing of the cost values, the amount of available memory, and the on-device usage data;
   manage each of the plurality of inactive applications in the respectively-selected pre-activation state, where managing the inactive application includes placing the inactive application into or maintaining the inactive application in the respectively-selected pre-activation state; and
   launch at least one of the plurality of inactive applications from the respective one of the plurality of pre-activation states.

10. The non-transitory computer-readable medium of claim 9, wherein the instructions that manage at least one of the inactive applications in one the plurality of pre-activation states comprise instructions that (1) retain the inactive application in the memory system, (2) move a portion of the inactive application into the memory system, or (3) move at least some application data from the inactive application onto a storage device.

11. The non-transitory computer-readable medium of claim 9, the instructions further causing the one or more processors to:
   access an offline model of application use; and
   evaluate the cost function to obtain the cost value in part using the offline model of application use.

12. The non-transitory computer-readable medium of claim 9, the instructions further causing the one or more processors to:
   produce at least one prediction of application use for at least some of the plurality of inactive applications;
   evaluate the cost function to obtain the cost value in part using the at least one prediction of application use; and
   selectively tune prediction parameters for producing the at least one prediction of application use.

13. The non-transitory computer-readable medium of claim 9, wherein the instructions that evaluate the cost function further comprise instructions that determine a likely persistence of the inactive application.

14. The non-transitory computer-readable medium of claim 9, the instructions further causing the one or more processors to determine the plurality of inactive applications for the evaluating of the cost function based on at least one of a current cost value, a last-computed cost value, a prediction of application use, a prediction of launch resources, or a prediction of memory behavior.

15. A computing device comprising:
   one or more memories;
   one or more processors communicatively coupled to the one or more memories and configured to execute instructions stored in the one or more memories for performing operations of:
      determining an amount of available memory in a memory system;

accessing on-device usage data for each of a plurality of inactive applications;

for each of the plurality of inactive applications:
for each of a plurality of pre-activation states:
evaluating a cost function to obtain a cost value indicating a preference for the inactive application to be placed into the pre-activation state;
comparing the cost values of the cost functions for the plurality of pre-activation states for the plurality of inactive applications to each other; and
selecting, for each of the plurality of inactive applications, a respective one of the plurality of pre-activation states, as determined based on the comparing of the cost values, the amount of available memory, and the on-device usage data;

managing each of the plurality of inactive applications in the respectively-selected pre-activation state, where managing the inactive application includes placing the inactive application into or maintaining the inactive application in the respectively-selected pre-activation state; and launching at least one of the plurality of inactive applications from the respective one of the plurality of pre-activation states.

16. The computing device of claim 15, wherein the instructions that manage at least one of the inactive applications in one the plurality of pre-activation states further comprise instructions for performing the operation of (1) retaining the inactive application in the memory system, (2) moving a portion of the inactive application into the memory system, or (3) moving at least some application data from the inactive application onto a storage device.

17. The computing device of claim 15, the one or more processors configured to execute instructions for performing the operations of:
accessing an offline model of application use; and
evaluating the cost function to obtain the cost value in part using the offline model of application use.

18. The computing device of claim 15, the one or more processors configured to execute instructions for performing the operations of:
producing at least one prediction of application use for at least some of the plurality of inactive applications;
evaluating the cost function to obtain the cost value in part using the at least one prediction of application use; and
selectively tuning prediction parameters for producing the at least one prediction of application use.

19. The computing device of claim 15, wherein the instructions that evaluate the cost function further comprise instructions for performing the operation of determining a likely persistence of the inactive application comprise instructions that determine a likely persistence of the inactive application.

20. The computing device of claim 15, the one or more processors configured to execute instructions for performing the operation of determining the plurality of inactive applications for the evaluating of the cost function based on at least one of a current cost value, a last-computed cost value, a prediction of application use, a prediction of launch resources, or a prediction of memory behavior.

* * * * *